United States Patent
Wu

(10) Patent No.: US 6,171,011 B1
(45) Date of Patent: Jan. 9, 2001

(54) STRUCTURE OF PIVOT JOINT

(76) Inventor: Yu-Chih Wu, 13/F-19, No. 12, Alley 103, Lane 111, Yu-Men Rd., Taichung City (TW)

(*) Notice: Under 35 U.S.C. 154(b), the term of this patent shall be extended for 0 days.

(21) Appl. No.: 09/225,336

(22) Filed: Jan. 5, 1999

(51) Int. Cl.$^7$ .................................................. E05D 11/04
(52) U.S. Cl. ......................... 403/119; 403/120; 403/150; 16/342; 16/337
(58) Field of Search ................................ 403/119, 120, 403/117, 113, 150, 164; 16/342, 340, 337

(56) References Cited

U.S. PATENT DOCUMENTS

| | | | | |
|---|---|---|---|---|
| 5,008,976 | * | 4/1991 | Busch | 16/342 X |
| 5,178,481 | * | 1/1993 | Kawamura | 16/342 X |
| 5,486,056 | * | 1/1996 | Thorn | 403/120 X |
| 5,906,010 | * | 5/1999 | Suzuki | 16/342 X |

* cited by examiner

Primary Examiner—Lynne H. Browne
Assistant Examiner—John R. Cottingham
(74) Attorney, Agent, or Firm—Rosenberg, Klein & Lee

(57) ABSTRACT

A pivot joint includes two mounting plates respectively fixedly fastened to two parts of an apparatus and coupled together by a rivet for enabling the two mounting plates to be turned relative to each other, an axle sleeve mounted on the rivet between the two mounting plates, a first washer and a second washer respectively mounted on the rivet and attached to one mounting plate at two opposite sides, wherein the axle sleeve has an embossed end edge at one end disposed in contact with the second mounting plate and a recessed coupling hole at an opposite end; the rivet is a stepped rivet having a shoulder from the head thereof and fitted into the recessed coupling hole at the axle sleeve, an annular groove at the head around the shoulder, and a plain end axially extended from the shoulder and inserted through the axle sleeve and the first and second mounting plates and hammered down to form another head; the second washer is made of friction rubber and mounted in the annular groove at the head of the rivet, having a plurality of raised portions raised from one side thereof and disposed in close contact with the first mounting plate.

1 Claim, 3 Drawing Sheets

STRUCTURE OF PIVOT JOINT

BACKGROUND OF THE INVENTION

The present invention relates to a pivot joint for use in a computer, and more particularly to such a pivot joint which can be positively positioned at any of a series of angles.

FIGS. 1A and 1B show a prior art pivot joint for use in for example a notebook computer. This structure of pivot joint comprises a first mounting plate 1 fixedly fastened to the mainframe of the notebook, a second mounting plate 2 fixedly fastened to the cover of the notebook, an axle sleeve 5 coupled between the first mounting plate 1 and the second mounting plate 2, two metal washers 4 attached to the first mounting plate 1 at two opposite sides, a rivet 6 mounted in respective holes 7 at the second mounting plate 2, the axle sleeve 5, the metal washers 4 and the first mounting plate 1, and a locating ring 3 fastened to the end of the rivet 6. The plain end of the rivet 6 is hammered down to form a head after installation of the locating ring 3. This structure of pivot joint is still not satisfactory in function because of the following drawbacks. One drawback of this structure of pivot joint is that the metal washers 4 wear gradually with the use of the pivot joint. When the metal washers 4 start to wear, the connection between the first mounting plate 1 and the second mounting plate 2 become unstable. Another drawback of this structure of pivot joint is its complicated structure. Because this structure of pivot joint consists of a number of parts, its manufacturing cost is relatively high. Furthermore, because the metal washers 4 are rigid and not flexible, they do not provide sufficient resisting force to positively support the second mounting plate 2 on the first mounting plate 1 at a particular angle.

SUMMARY OF THE INVENTION

The present invention provides a pivot joint which eliminates the aforesaid drawbacks. According to the present invention, the pivot joint comprises two mounting plates respectively fixedly fastened to two parts of an apparatus and coupled together by a rivet for enabling the two mounting plates to be turned relative to each other, an axle sleeve mounted on the rivet between the two mounting plates, a first washer and a second washer respectively mounted on the rivet and attached to one mounting plate at two opposite sides. The second washer is made of friction rubber ands received in an annular groove at the head of the rivet, having raised portions disposed at one side and stopped against the first mounting plate. The axle sleeve has an embossed end edge at one end stopped against the second mounting plate, and a recessed coupling hole at an opposite end. The rivet is a stepped rivet having a shoulder fitted into the recessed coupling hole at the axle sleeve. Because the second washer is made of friction rubber, it is compressible for allowing the two mounting plates to be turned relative to each other and then positioned at the adjusted angle.

DETAILED DESCRIPTION OF THE PREFERRED EMBODIMENT

Figure 1A:
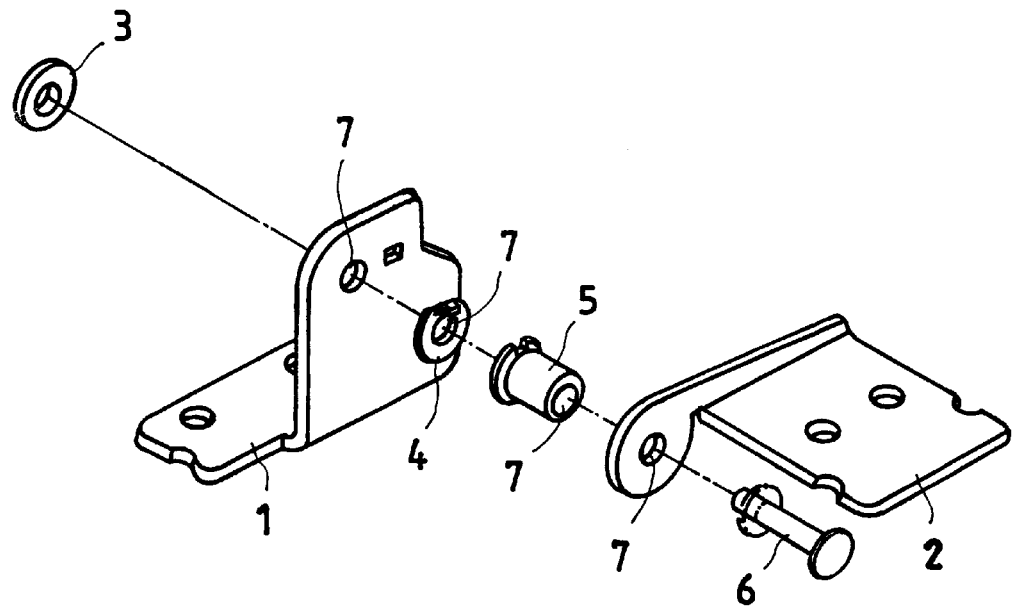
FIG. 1A is an exploded view of a pivot joint according to the prior art.
Figure 1B:
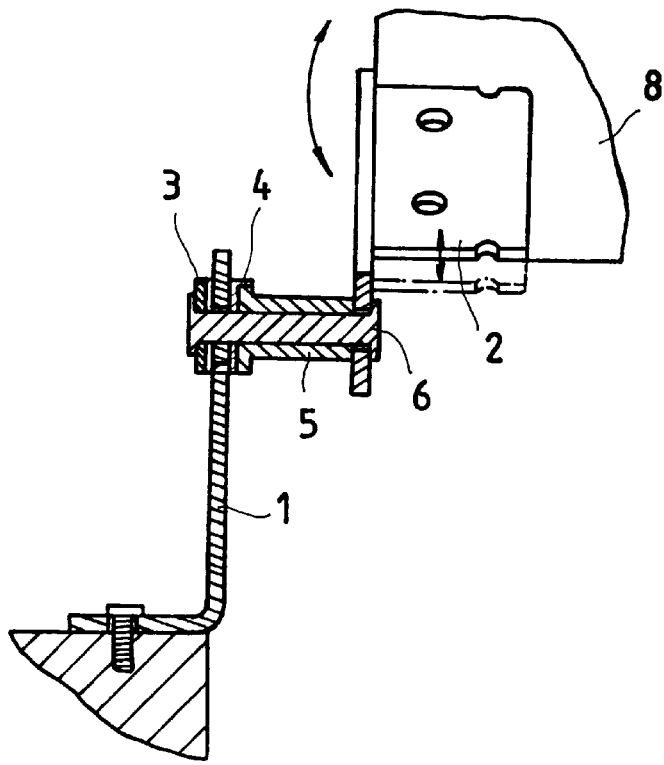
FIG. 1B is a sectional assembly view of the pivot joint shown in FIG. 1A.
Figure 2:
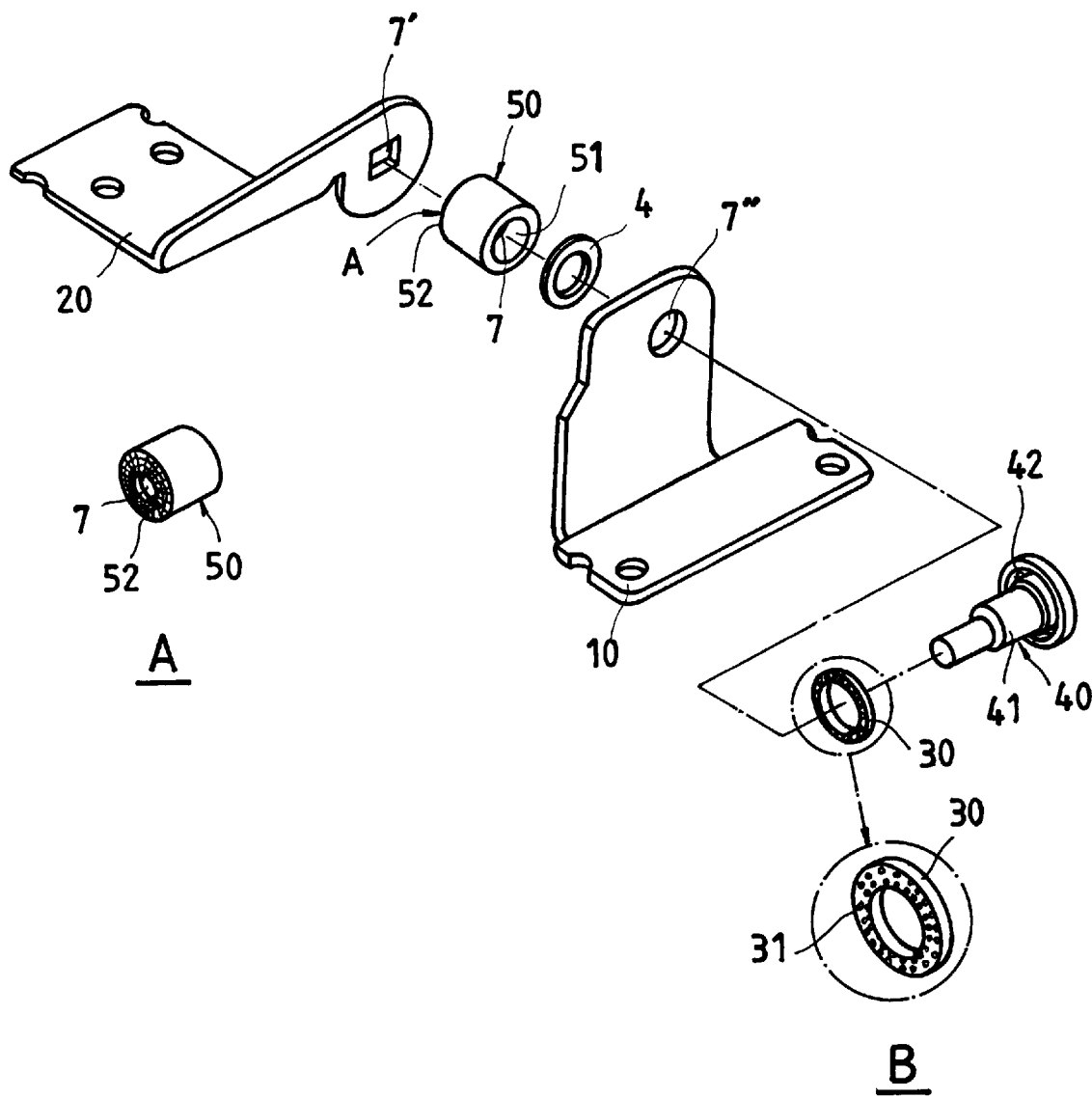
FIG. 2 is an exploded view of a pivot joint according to the present invention.
Figure 3:
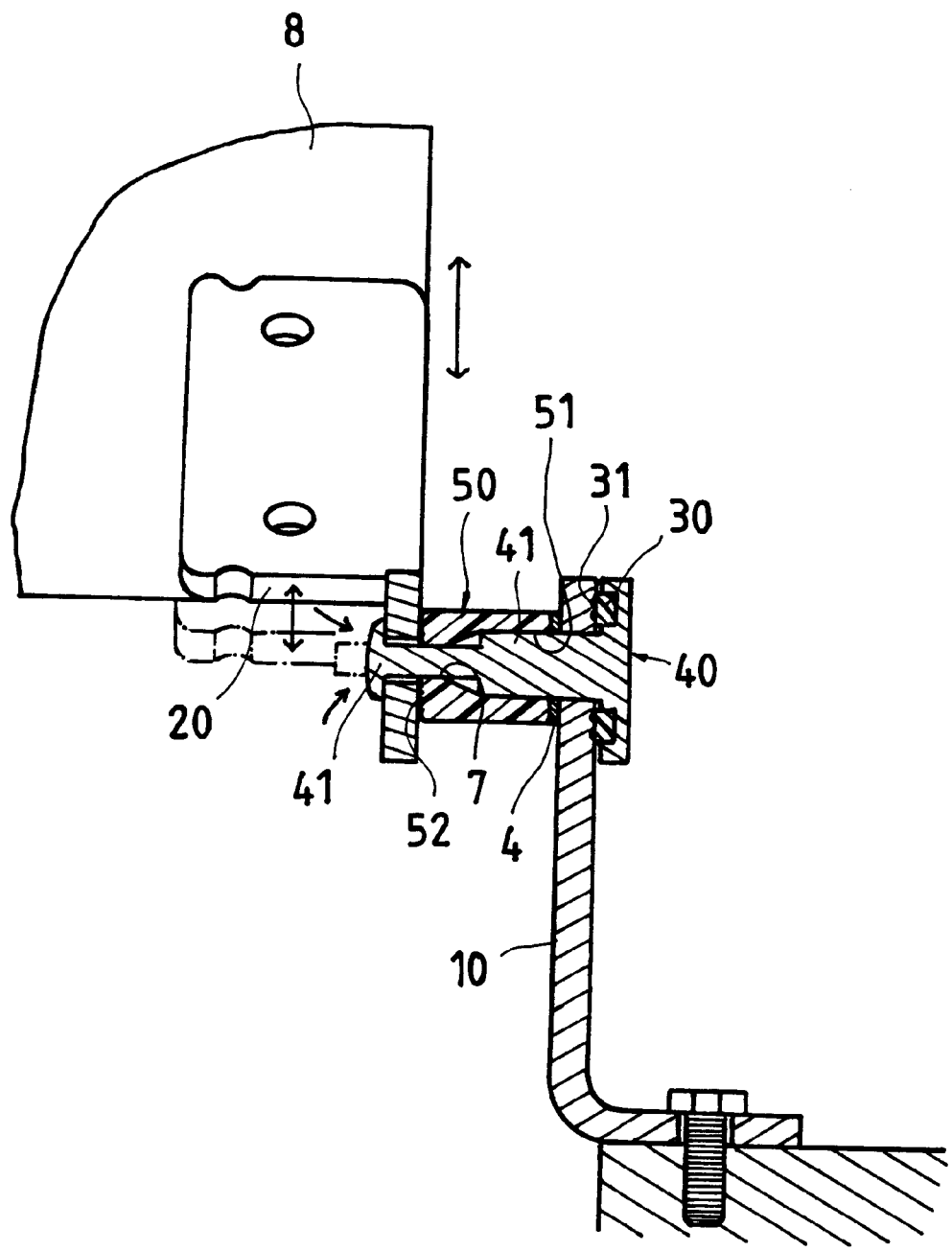
FIG. 3 is a sectional assembly view of the pivot joint shown in FIG. 2.

Referring to FIGS. 2 and 3, a pivot joint in accordance with the present invention is comprised of a first mounting plate 10 fixedly fastened to the mainframe of a notebook computer, a second mounting plate 20 fixedly fastened to the cover 8 of the notebook computer, an axle sleeve 50 coupled between the first mounting plate 10 and the second mounting plate 20, a rivet 40 mounted in respective holes 7, 7' and 7" at the axle sleeve 50, the second mounting plate 20 and the first mounting plate 10, for enabling the second mounting plate 20 to be turned about the rivet 40 relative to the first mounting plate 20, a first washer 4 and a second washer 30 respectively mounted on the rivet 40 and attached to the first mounting plate 10 at two opposite sides.

The axle sleeve 50 comprises an embossed end edge 52 disposed at one end in close contact with the second mounting plate 20, a recessed coupling hole 51 disposed at an opposite end around its axial center through hole 7. The rivet 40 is a stepped rivet having a shoulder 41 perpendicularly raised from the head thereof and fitted into the recessed coupling hole 51 at the axle sleeve 50, an annular groove 42 at the head around the shoulder 41, and a plain end axially extended from the shoulder 41 and inserted through the axial center through hole 7 of the axle sleeve 50 and the hole 7' at the second mounting plate 20 and hammered down to form another head. The second washer 30 is made of friction rubber and mounted in the annular groove 42 at the head of the rivet 40 around the shoulder 41, having a plurality of raised portions 31 raised from one side thereof and disposed in close contact with the first mounting plate 10.

When the second mounting plate 20 is turned with the cover of the notebook computer relative to the first mounting plate 10 at the mainframe of the notebook computer, the second washer 30 is compressed, enabling the second mounting plate 20 to be turned with the cover of the notebook computer. When the cover of the notebook computer is released from the hand, the second washer 30 immediately returns to its former shape, imparting a push force to push the rivet 40 away from the first mounting plate 10, enabling the second mounting plate 20 to be firmly retained at the adjusted angle.

What the invention claimed is:

1. A pivot-joint assembly comprising:
   (a) first and second mounting plates;
   (b) a stepped rivet coupling together said first and second mounting plates, said rivet having a head portion, and plain end portion, and a shoulder portion extending axially therebetween, said head portion having formed therein an annular groove disposed about said shoulder portion, said shoulder being greater in radial dimension than at least a portion of said plain end portion, said plain end portion having a radially flared termination for locking said coupling of said first and second mounting plates;
   (c) an axle sleeve coaxially coupled to said rivet and disposed between said first and second mounting plates, said axle sleeve having formed therein a coupling recess receiving said rivet shoulder portion and a through hole extending axially from said coupling recess to receive therethrough said rivet plain end portion, said axle sleeve having an embossed end edge engaging said second mounting plate;
   (d) a first washer coaxially coupled to said rivet and captured between said axle sleeve and said first mounting plate; and,
   (e) a second washer captured between said rivet head portion and said first mounting plate within said annular groove, said second washer being formed of a composition containing friction rubber and having a plurality of raised portions protruding therefrom to engage said first mounting plate.

* * * * *